United States Patent
Weng et al.

(10) Patent No.: US 10,859,760 B2
(45) Date of Patent: Dec. 8, 2020

(54) LIGHT GUIDE PLATE AND BACKLIGHT MODULE

(71) Applicant: Nano Precision Taiwan Limited, Hsinchu County (TW)

(72) Inventors: Chao-Hung Weng, Hsinchu County (TW); Ming-Dah Liu, Hsinchu County (TW); Hung-Tse Lin, Hsinchu County (TW)

(73) Assignee: Nano Precision Taiwan Limited, Hsinchu County (TW)

( * ) Notice: Subject to any disclaimer, the term of this patent is extended or adjusted under 35 U.S.C. 154(b) by 0 days.

(21) Appl. No.: 16/583,294

(22) Filed: Sep. 26, 2019

(65) Prior Publication Data

US 2020/0103585 A1 Apr. 2, 2020

(30) Foreign Application Priority Data

Sep. 28, 2018 (CN) .......................... 2018 1 1136909

(51) Int. Cl.
*F21V 8/00* (2006.01)
*G02F 1/13357* (2006.01)

(52) U.S. Cl.
CPC ......... *G02B 6/0088* (2013.01); *G02B 6/0036* (2013.01); *G02F 1/133602* (2013.01); *G02F 1/133615* (2013.01)

(58) Field of Classification Search
CPC ................ G02B 6/0088; G02B 6/0036; G02F 1/133602; G02F 1/133615
See application file for complete search history.

(56) References Cited

U.S. PATENT DOCUMENTS

| | | | |
|---|---|---|---|
| 8,186,867 B2 | 5/2012 | Chen et al. | |
| 2008/0285309 A1 | 11/2008 | Fang et al. | |
| 2009/0109703 A1* | 4/2009 | Chen | G02B 6/0038 362/620 |

FOREIGN PATENT DOCUMENTS

| | | |
|---|---|---|
| CN | 105388556 A | 3/2016 |
| CN | 104948998 B | 10/2017 |
| CN | 207704062 U | 8/2018 |
| JP | 2010-210882 A | 9/2010 |
| TW | I349121 B | 9/2011 |
| TW | I443426 B | 7/2014 |
| TW | I481915 B | 4/2015 |

* cited by examiner

*Primary Examiner* — Nathanael R Briggs

(57) ABSTRACT

A light guide plate has a light-incident surface, a bottom surface, a light-emitting surface, first microstructures and second microstructures. The bottom surface is opposite to the light-emitting surface, the light-incident surface is connected between the bottom surface and the light-emitting surface. The first microstructures protrude from the bottom surface and are arranged at intervals along a direction parallel to the light-incident surface and extend from the light-incident surface in a predetermined direction. The second microstructures are disposed between the first microstructures away from the light-incident surface, and each them includes light-adjusting blocks protruding from the bottom surface and arranged along the predetermined direction. Each first microstructure has a first height, and each light-adjusting block has a second height smaller than the first height. The light guide plate has a reduced horizontal viewing angle and a maintained luminance. A backlight module including the light guide plate is of scratch resistance.

11 Claims, 9 Drawing Sheets

LIGHT GUIDE PLATE AND BACKLIGHT MODULE

CROSS-REFERENCE TO RELATED APPLICATION

This application claims the priority benefit of China application CN201811136909.4, filed on 2018 Sep. 28. The entirety of the above-mentioned patent application is hereby incorporated by reference herein and made a part of this specification.

FIELD OF THE INVENTION

The invention relates to a light guide component, and more particularly to a light guide plate and a backlight module using the same.

BACKGROUND OF THE INVENTION

The liquid crystal displays are nowadays widespread and applied to electronic devices having display function. A liquid crystal display includes a liquid crystal display panel and a backlight module. Since the liquid crystal display panel itself does not illuminate, it is therefore necessary that a backlight module provides a backlight to the liquid crystal display panel for displaying images. As a result, the quality of the backlight provided by the backlight module has an effect upon image quality.

The backlight module includes direct-type backlight modules and side-type backlight modules. A side-type backlight module has the advantage of small in thickness and is applied extensively to slim-type electronic devices. A side-type backlight module includes a light source and a light guide plate. The light guide plate is used to guide the light rays emitted from the point light source or the linear light source disposed beside a light-incident surface of the light guide plate to a light-emitting surface of the light guide plate so as to form a surface light source. In general, microstructures are formed on the surface of the light guide plate to guide the light rays' direction and therefore improve the light-emitting efficiency and the optical quality of the backlight module. That is, the optical performance of the backlight module is related closely to the design of microstructure of the light guide plate.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light guide plate having a function of reducing a horizontal viewing angle and maintaining luminance.

The invention provides a backlight module having a function of reducing a horizontal viewing angle, maintaining luminance and scratch resistance.

Other advantages and objects of the invention may be further understood by the technical features disclosed in the invention.

In order to achieve one or a portion of or all of the objects or other objects, an embodiment of the invention provides a light guide plate. The light guide plate has a light-incident surface, a bottom surface, a light-emitting surface, a plurality of first microstructures and a plurality of second microstructures, wherein the bottom surface is opposite to the light-emitting surface, the light-incident surface is connected between the bottom surface and the light-emitting surface. The plurality of first microstructures protrude from the bottom surface and are arranged at intervals along a direction parallel to the light-incident surface and extend from the light-incident surface in a predetermined direction away from the light-incident surface. The plurality of second microstructures is disposed between the plurality of first microstructures, each of the plurality of second microstructures comprises a plurality of light-adjusting blocks protruding from the bottom surface and arranged along the predetermined direction, wherein each of the plurality of first microstructures has a first height relative to the bottom surface, each of the light-adjusting blocks has a second height relative to the bottom surface, and the second height is smaller than the first height.

In order to achieve one or a portion of or all of the objects or other objects, an embodiment of the invention further provides a backlight module. The backlight module includes the light guide plate mentioned above and a light source disposed beside the light-incident surface of the light guide plate.

By means of the plurality of first microstructures, the light guide plate of the embodiment of the invention has a reduced light output at a large angle and a reduced horizontal viewing angle. The plurality of second microstructures controls light-emitting angles and further improves the luminance of the light guide plate at the main light-emitting angle. In addition, the light guide plate of the embodiment of the invention further contacts a reflective sheet disposed on the bottom surface with the first microstructures. A contact area between the light guide plate and the reflective sheet is therefore smaller, so as to prevent the reflective sheet from being sucked by the light guide plate and the scratch caused by the contact friction. The plurality of first microstructures and the plurality of second microstructures of the embodiment of the invention are arranged alternately and that the first height of the first microstructures is different from the second height of the light-adjusting block of the second microstructures, accordingly, grooves with depth are formed at the bottom surface so as to prevent dust particles from contacting with the reflective sheet and the microstructures and the scratch caused by the contact friction.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
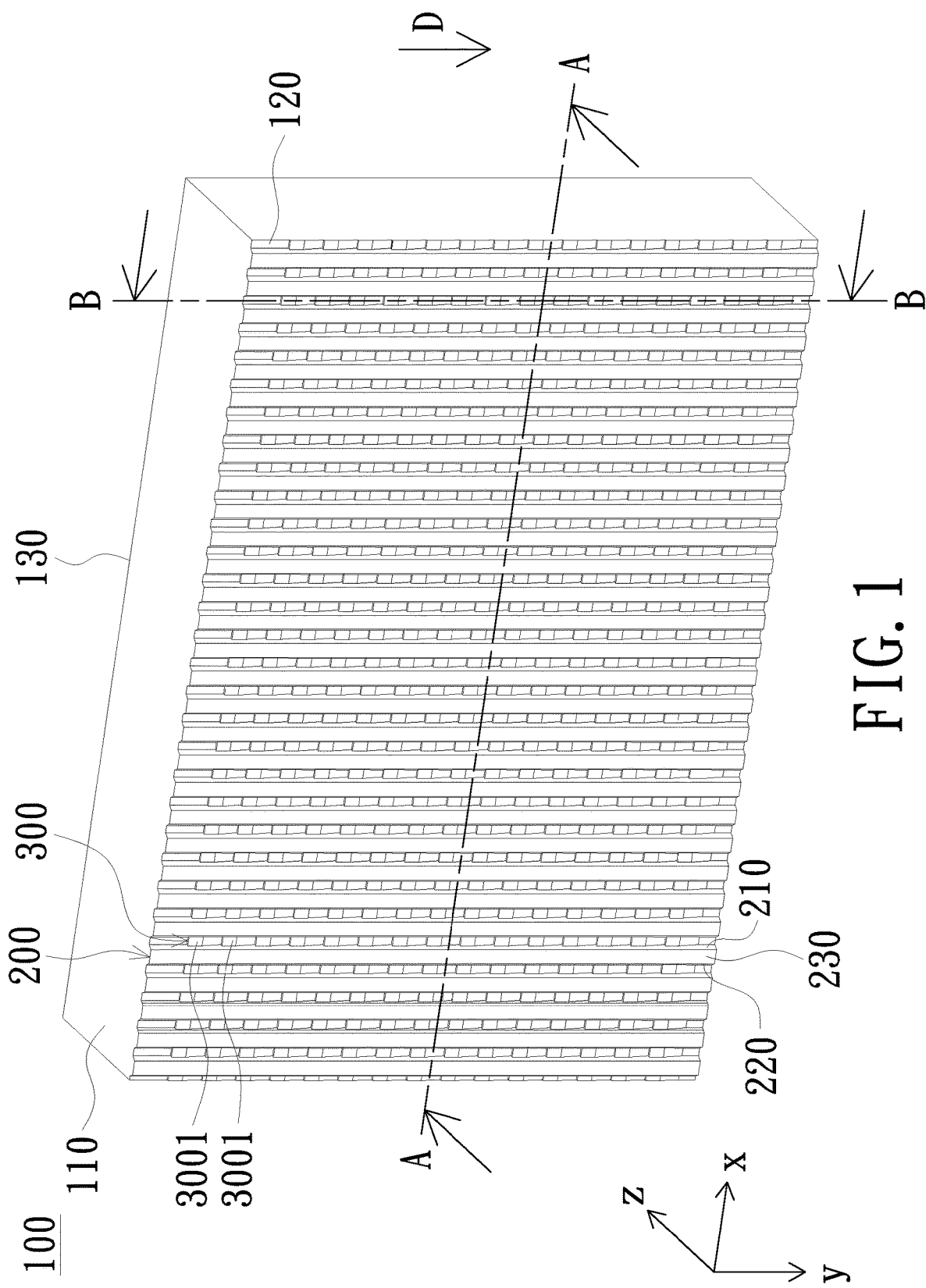
FIG. 1 is a schematic perspective diagram of a light guide plate of an embodiment of the invention.
Figure 2:
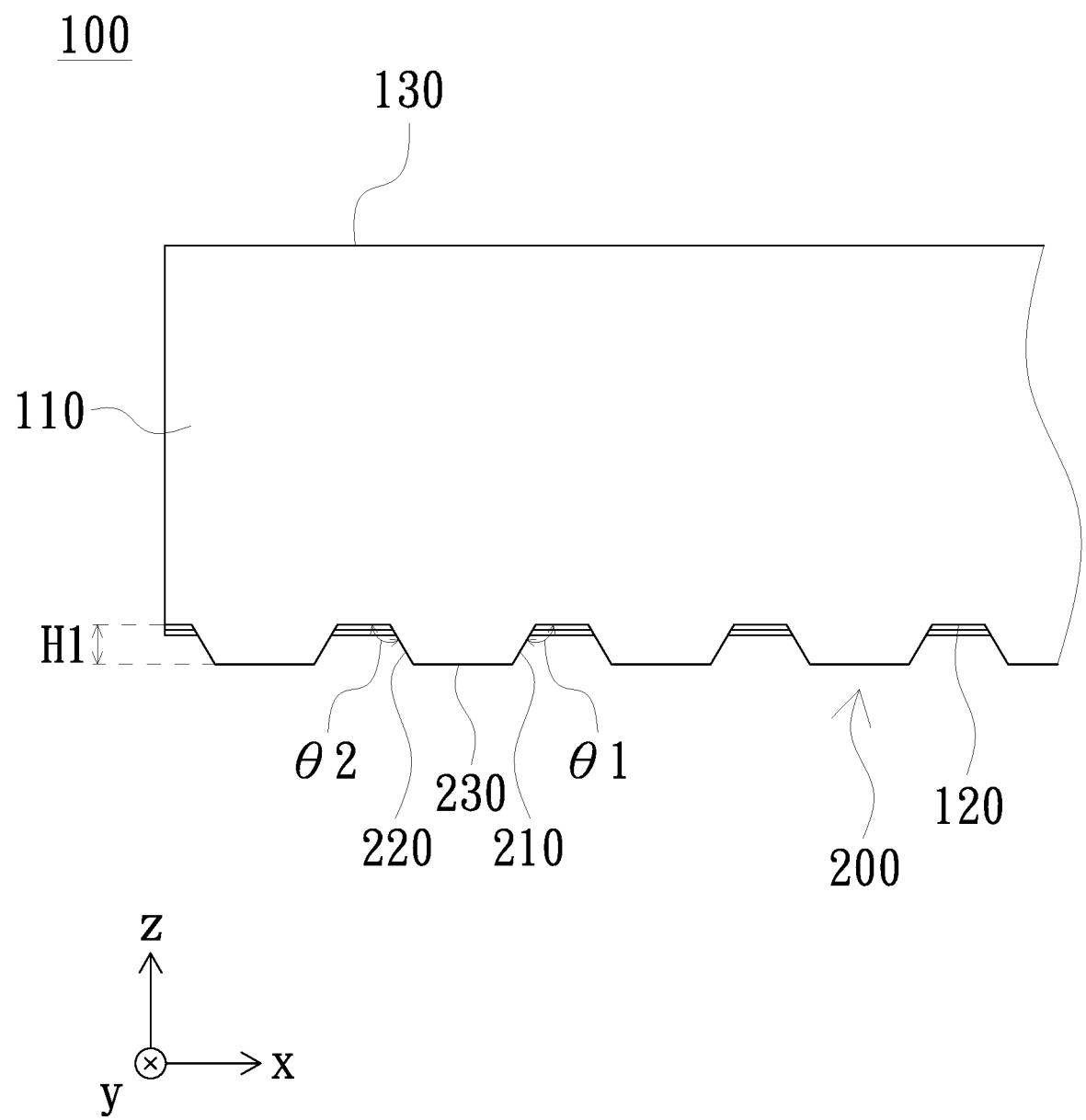
FIG. 2 is a schematic cross-sectional diagram along the A-A line shown in FIG. 1.

FIG. 1 is a schematic perspective diagram of a light guide plate of an embodiment of the invention. As shown in FIG. 1, the light guide plate 100 has a light-incident surface 110, a bottom surface 120, a light-emitting surface 130, a plurality of first microstructures 200 and a plurality of second microstructures 300. The bottom surface 120 is opposite to the light-emitting surface 130, and the light-incident surface 110 is connected between the bottom surface 120 and the light-emitting surface 130. Further refer to FIG. 2. FIG. 2 is a schematic cross-sectional diagram along the A-A line shown in FIG. 1. The plurality of first microstructures 200 protrude from the bottom surface 120 and are arranged at intervals along a direction parallel to the light-incident surface 110. That is, the plurality of first microstructures 200 is arranged at intervals along an x-axis when a long side of the light-incident surface 110 is parallel to the x-axis. The first microstructures 200 extend from the light-incident surface 110 toward a predetermined direction D away from the light-incident surface 110, respectively. In the embodiment, when the light-incident surface 110 is located on an x-z plane, the plurality of first microstructures 200 may extend along a y-axis in the predetermined direction D perpendicular to the light-incident surface 110, but is not limited thereto. In other embodiments, the light guide plate 100 may be a dual-sided light guide plate and has two light-incident surfaces 110 located at two opposite sides of the light guide plate 100. In such circumstance, the plurality of first microstructures 200 extends from one of the light-incident surfaces 110 toward the opposite light-incident surfaces 110. In addition, in one embodiment, the plurality of first microstructures 200 is convexly protruded from the bottom surface 120 and has a first height H1 relative to the bottom surface 120, wherein the first height H1 is greater than or equal to 1 µm and less than or equal to 20 µm.

Figure 4:
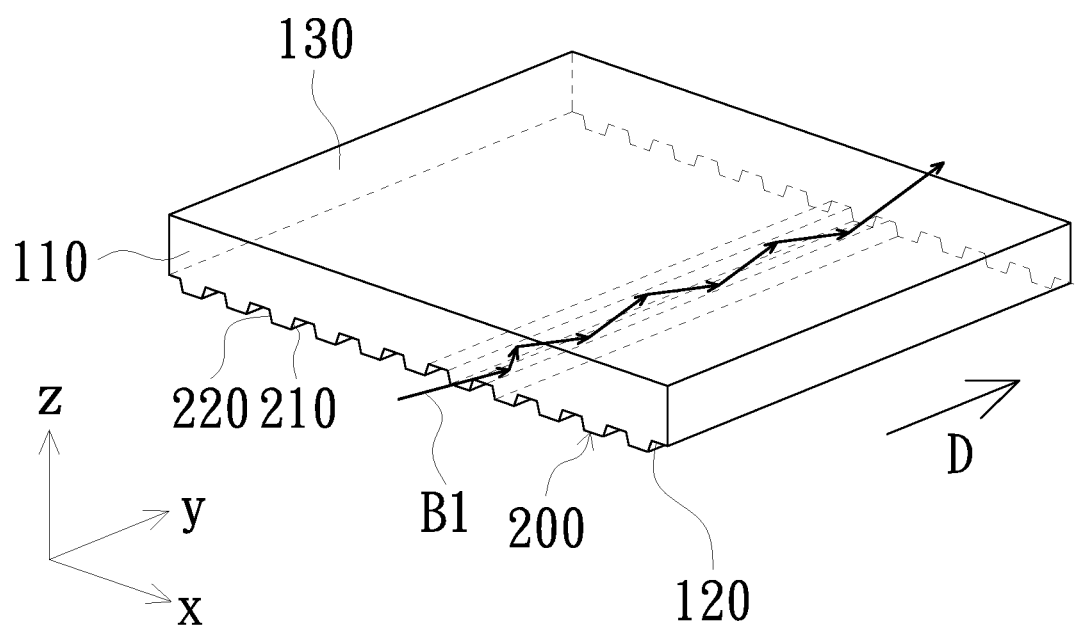
FIG. 4 is a schematic diagram of a light path of a light ray incident a first microstructure.

Further, the first microstructure 200 includes a first light-guiding surface 210 and a second light-guiding surface 220 extending along the predetermined direction D, wherein a first angle θ1 is formed between the first light-guiding surface 210 and the bottom surface 120, and a second angle θ2 is formed between the second light-guiding surface 220 and the bottom surface 120. In one embodiment, the first angle θ1 is greater than or equal to 90 degrees and less than 135 degrees, the second angle θ2 is greater than or equal to 90 degrees and less than 135 degrees. In the embodiment as illustrated in FIG. 4, the light ray (such as the light ray B1) incident from the light-incident surface 110 is transmitted inside the light guide plate 100 substantially along the extending direction of the light guide plate 100 (i.e., the predetermined direction D described above). In addition, most of the light rays transmitted inside the light guide plate 100 may undergo one or more total internal reflections between the light-emitting surface 130, the bottom surface 120 and/or the first microstructures 200. Wherein, when being incident on the first microstructures 200, the light rays are reflected by the first light-guiding surface 210 and the second light-guiding surface 220 alternately, thereby reducing a light output of the light guide plate 100 at a large angle and a horizontal viewing angle in the x-axis direction.

Figure 3:
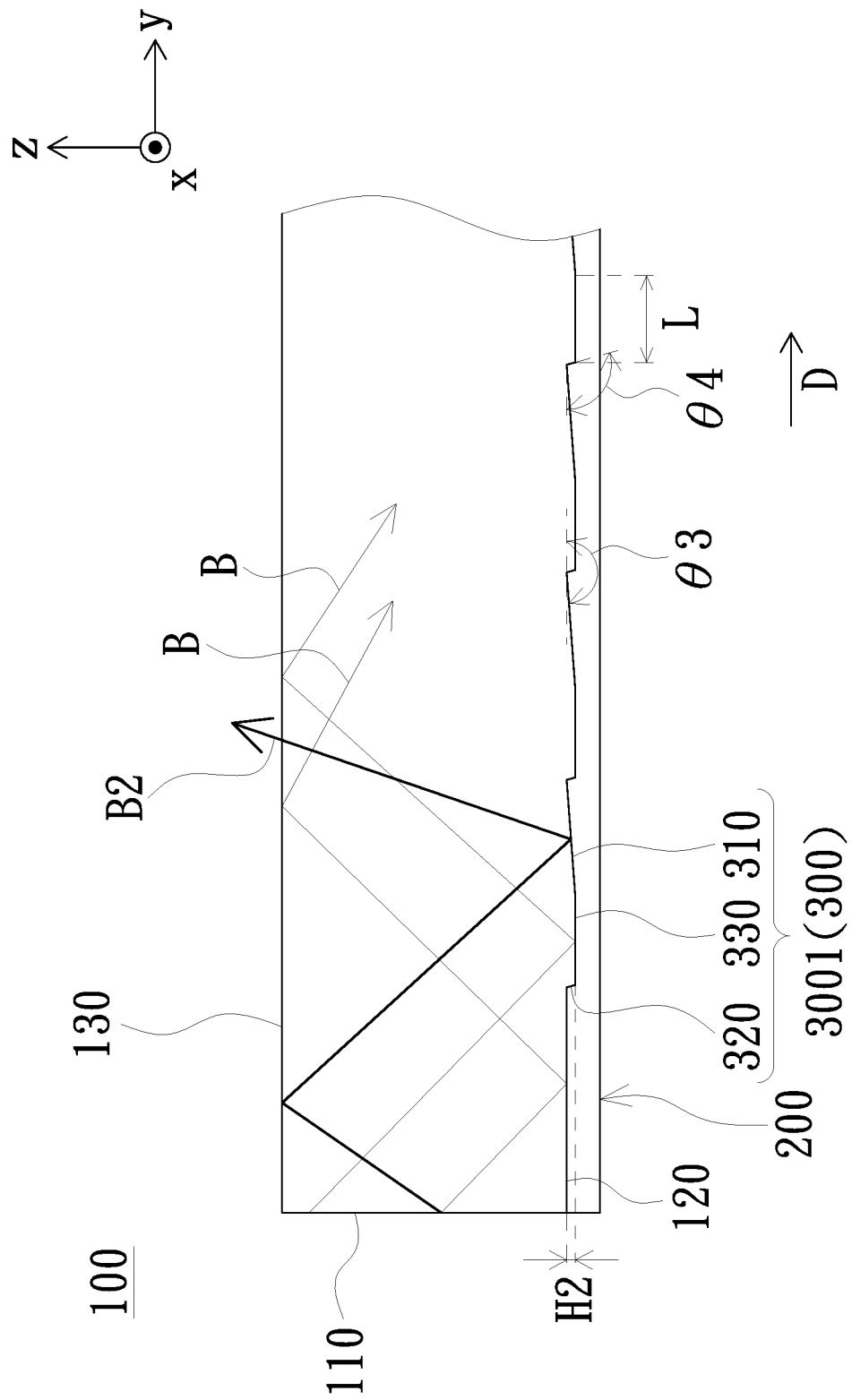
FIG. 3 is a schematic cross-sectional diagram along the B-B line shown in FIG. 1.

The plurality of second microstructures 300 is disposed between the plurality of adjacent first microstructures 200. Further, the second microstructures 300 and the first microstructures 200 are arranged alternately on the bottom surface 120. Each of the second microstructures 300 includes a plurality of light-adjusting blocks 3001 arranged along the predetermined direction D. Further, please refer to FIG. 3, which is a schematic cross-sectional diagram along the B-B line shown in FIG. 1. In the embodiment, the light-adjusting block 3001 protrudes from the bottom surface 120 and has a second height H2 relative to the bottom surface 120, and the second height H2 is smaller than the first height H1.

The light-adjusting block 3001 includes a first inclined surface 310 and a second inclined surface 320. The first inclined surface 310 faces away from the light-incident surface 110 and tilts relative to the bottom surface 120, and the second inclined surface 320 faces the light-incident surface 110. In the embodiment in which all the light-adjusting blocks 3001 protrude from the bottom surface 120, a third angle θ3 is formed between the first inclined surface 310 and the bottom surface 120, and a fourth angle θ4 is formed between the second inclined surface 320 and the bottom surface 120. In one embodiment, the third angle θ3 is greater than or equal to 150 degrees and less than 180 degrees, and the fourth angle θ4 is greater than or equal to 90 degrees and less than 180 degrees. When the light is transmitted inside the light guide plate 100, the light rays (e.g., the light ray B) may also undergo one or more total internal reflections between the light-emitting surface 130, the bottom surface 120, the first microstructures 200 and/or the second microstructures 300. When the light rays transmitted to the first inclined surface 310 (e.g., the light ray B2) is reflected by the first inclined surface 310 to the light-emitting surface 130, the light rays have a high probability to exit from the light-emitting surface 130. By the design of the first inclined surface 310 and the third angle θ3, the angle of the light ray B2 emitted from the light-emitting surface 130 can be controlled, thereby improving the main light-emitting angle and the luminance of the light guide plate 100. Further, the second microstructures 300 can adjust the angle at which the light ray B2 exits from the light-emitting surface 130, for example, on the y-axis. With the first microstructures 200, as a whole, the light guide plate 100 can reduce the horizontal viewing angle along the x-axis and improve the luminance of the main light-emitting angle along the y-axis. In the embodiment in which the light guide plate 100 is a dual-sided light guide plate, the angle of the light ray B2 exited from the light-emitting surface 130 can also be controlled by the design of the second inclined surface 320 and the fourth angle θ4. In the embodiment in which the light guide plate 100 is a dual-sided light guide plate, it can be designed that the third angle θ3 is equal to the fourth angle θ4, so that the lights from the two sides of the light-incident surface 110 have substantially equal light-emitting angles. The light rays exited from the light guide plate 100 can be further adjusted by an optical film to exit in a forward direction (i.e., substantially in the z-axis).

Figure 9:
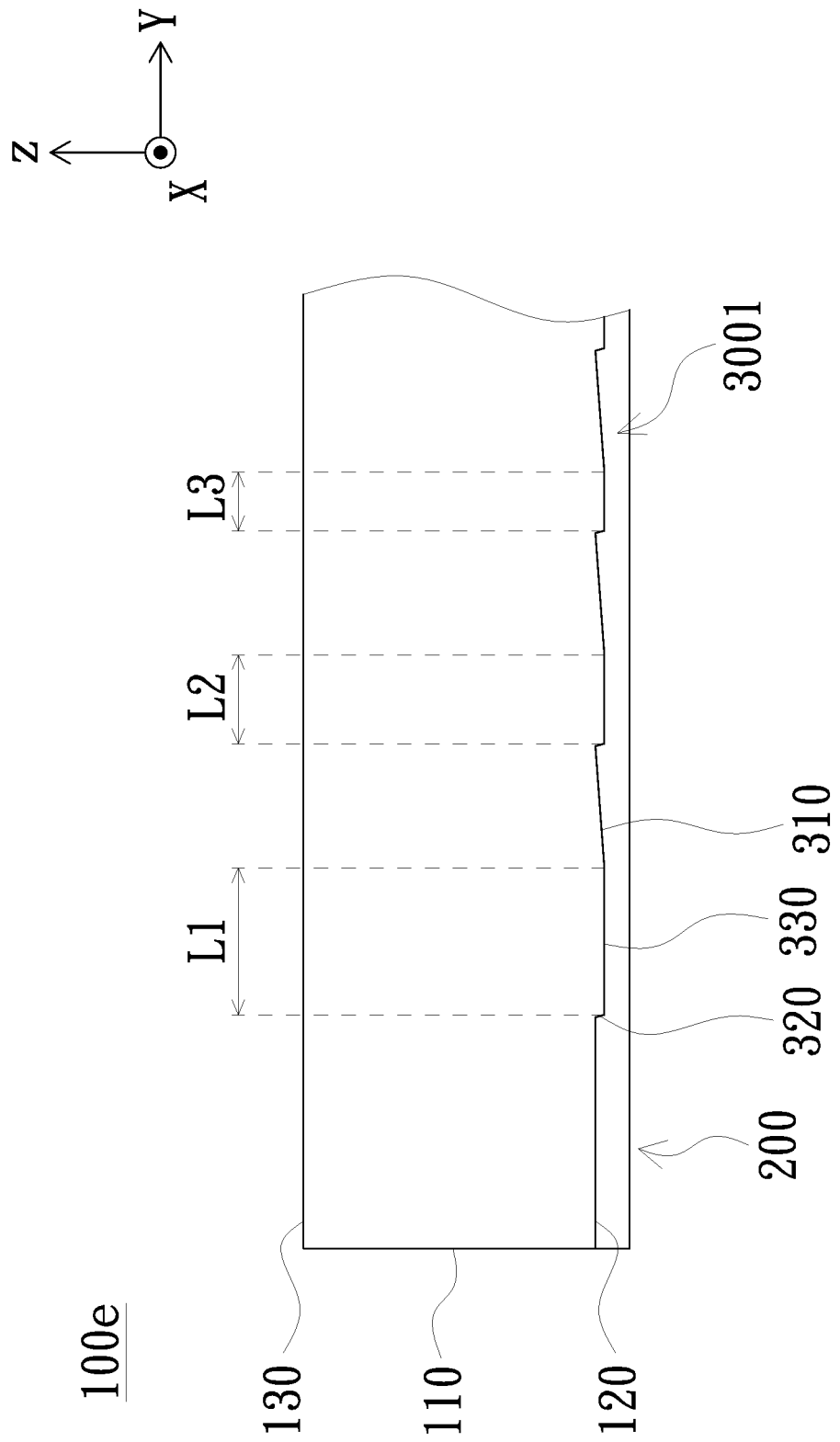
FIG. 9 is a partial schematic cross-sectional diagram of a light guide plate of still another embodiment of the invention.

The second microstructure 300 may further include a second connecting surface 330. The second connecting surface 330 is opposite to the bottom surface 120, and the two opposite sides thereof are connected to the first inclined surface 310 and the second inclined surface 320 respectively. The second connecting surface 330 has a length L parallel to the predetermined direction D and, the length L is less than or equal to 100 μm. The length L can be designed based on the length of the light guide plate 100 in the predetermined direction D and the number and length of the light-adjusting block 3001. In addition, in the plurality of light-adjusting blocks 3001 of the second microstructures 300, the length L of the second connecting surfaces 330 may be different. As the embodiment shown in FIG. 9, the light guide plate 100e has a plurality of light-adjusting blocks 3001. The length L3 of the second connecting surface 300 of the light-adjusting block 3001 farther away from the light-emitting surface 110 is shorter, the length L1 of the second connecting surface 300 of the light-adjusting block 3001 closer to the light-incident surface 110 is longer, the length L2 is between the length L1 and the length L3, i.e., L3<L2<L1. In general, as shown in FIG. 9, the distance between the adjacent first inclined surfaces 310 can be reduced by shortening the length of the second connecting surface 330, that is, the density of the first inclined surface 310 increases as it is away from the light incident surface 110. Since the light rays transmitted to the first inclined surface 310 of the second microstructure 300 have a high probability to exit from the light-emitting surface 130 when being reflected to the light-emitting surface 130, the higher density of the first inclined surfaces 310 can improve the light output. The closer to the light-incident surface 110, the closer to the light source, and the light intensity is stronger. On the other hand, the farther away from the light-incident surface 110, the light intensity is weaker. Therefore, by the density design of the first inclined surfaces 310 described above, that is, the density of the first inclined faces 310 increases as away from the light-incident surface 110, the overall brightness uniformity of the light surface 130 can be improved. In another embodiment, the second microstructures 300 may not include the second connecting surfaces 330, and the first inclined surface 310 and the second inclined surface 320 are connected to each other.

Figure 5:
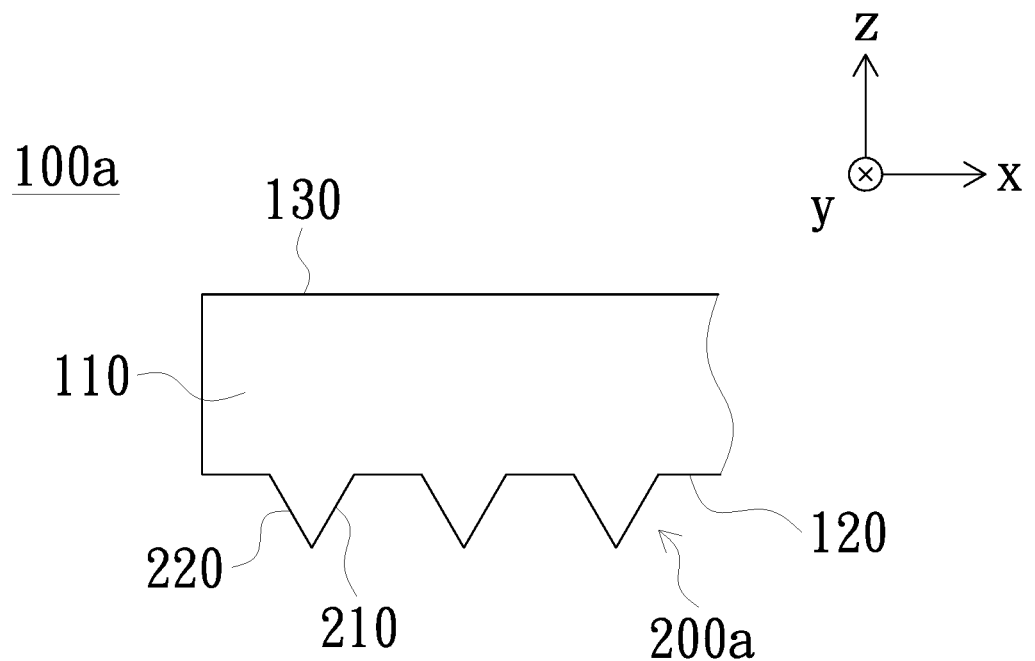
FIG. 5 is a partial schematic cross-sectional diagram of a light guide plate of another embodiment of the invention.

Please refer again to FIG. 1 and FIG. 2. The first microstructure 200 may further include a first connecting surface 230. The first connecting surface 230 is opposite to the bottom surface 120, and the two opposite sides thereof are connected to the first light-guiding surface 210 and the second light-guiding surface 220 respectively. In the embodiment shown in FIG. 2, the first connecting surface 230 is a plane and is connected to the first light-guiding surface 210 and the second light-guiding surface 220 inclined with respect to the bottom surface 120. The first height H1 is a constant, so that the first microstructure 200 is in the form of a trapezoidal cylinder. In the light guide plate 100a in another embodiment as shown in FIG. 5, the first light-guiding surface 210 is connected to the second-guiding surface 220, so that the first microstructure 200a is in the form of a triangular cylinder. The first height H1 is not limited to a constant. In other embodiments, the first height H1 may increase or decrease along with the predetermined direction D, for example, decreasing as being away from the light-incident surface 110, but is not limited thereto.

Figure 6:
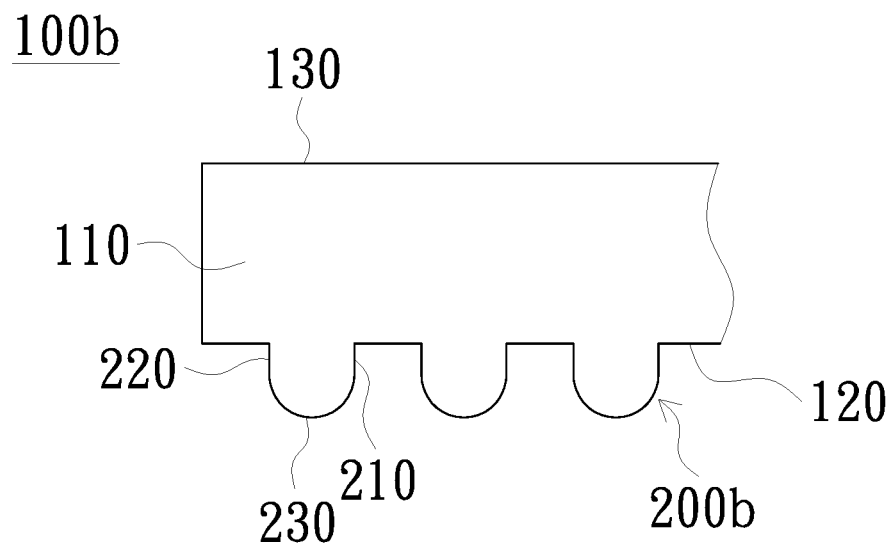
FIG. 6 is a partial schematic cross-sectional diagram of a light guide plate of still another embodiment of the invention.
Figure 7:
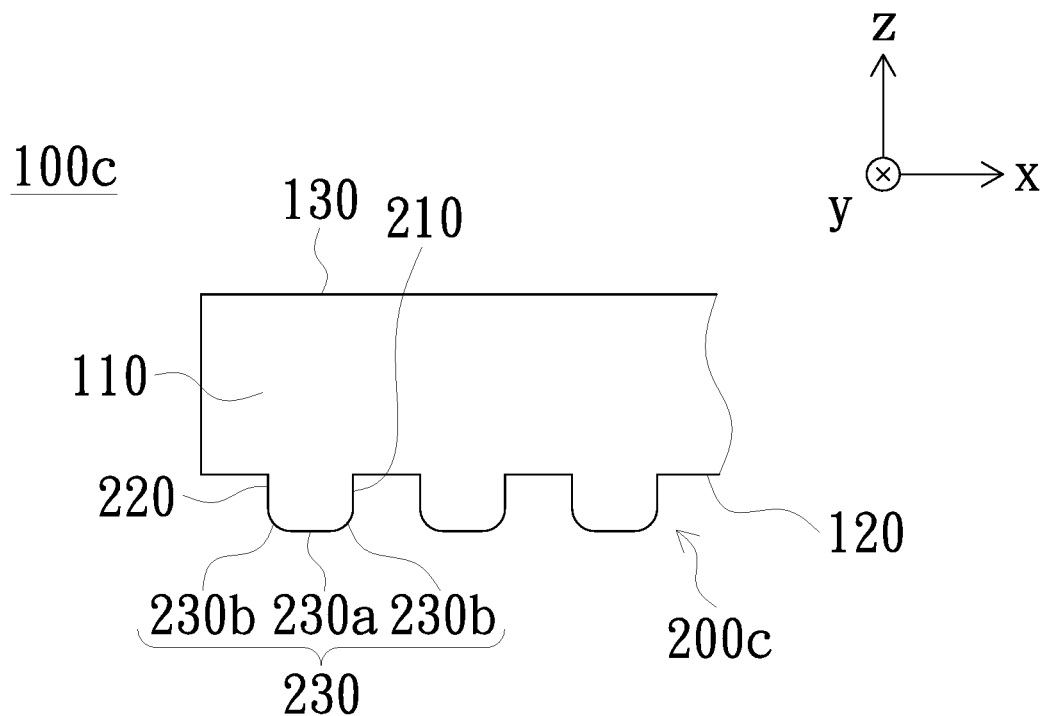
FIG. 7 is a partial schematic cross-sectional diagram of a light guide plate of still another embodiment of the invention.

In the light guide plate 100b according to another embodiment as shown in FIG. 6, the first connecting surface 230 may be a convex curved surface. In the light guide plate 100c according to still another embodiment as shown in FIG. 7, the first connecting surface 230 may include a planar portion 230a and a curved portion 230b. In this embodiment, the planar portion 230a is located between the curved portion 230b and the curved portion 230b which are located on the two opposite sides of the planar portion 230a respectively. The first connecting surface 230 is connected to the first light-guiding surface 210 and the second light-guiding surface 220 by the curved portions 230b. The curved portions 230b located on the two opposite sides of the planar portion 230a may have the same radius of curvature or have different radiuses of curvature.

Figure 8:
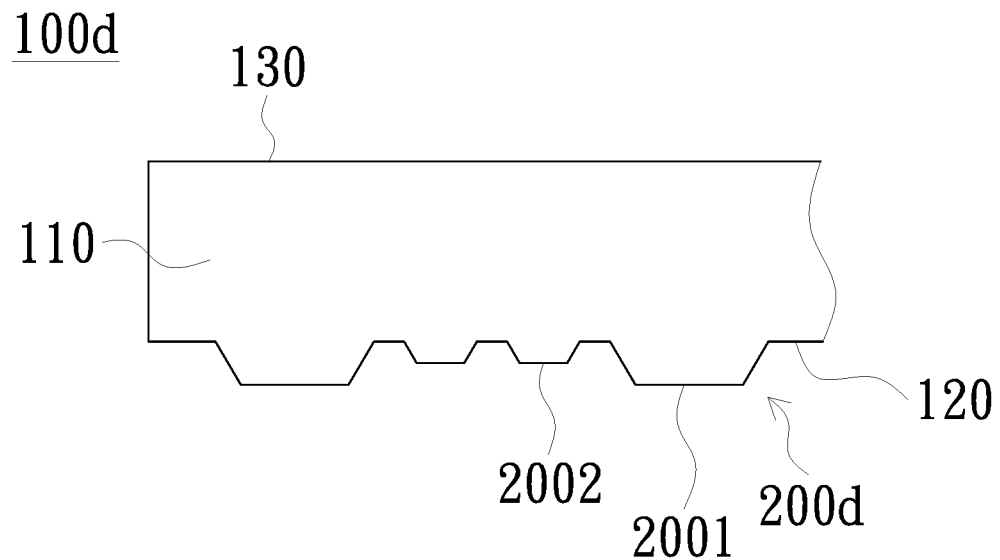
FIG. 8 is a partial schematic cross-sectional diagram of a light guide plate of still another embodiment of the invention.

In the light guide plate 100d according to another embodiment as shown in FIG. 8, the first microstructure 200d further includes a plurality of first light-guiding columns 2001 and a plurality of second light-guiding columns 2002. A height of the first light-guiding column 2001 is greater than a height of the second light-guiding column 2002, and at least one of the second light-guiding columns 2002 is disposed between any two adjacent first light-guiding columns 2001. When a reflective sheet is disposed under the light guide plate 100d, the light guide plate 100d and the reflective sheet can have a smaller contact area.

Figure 10:
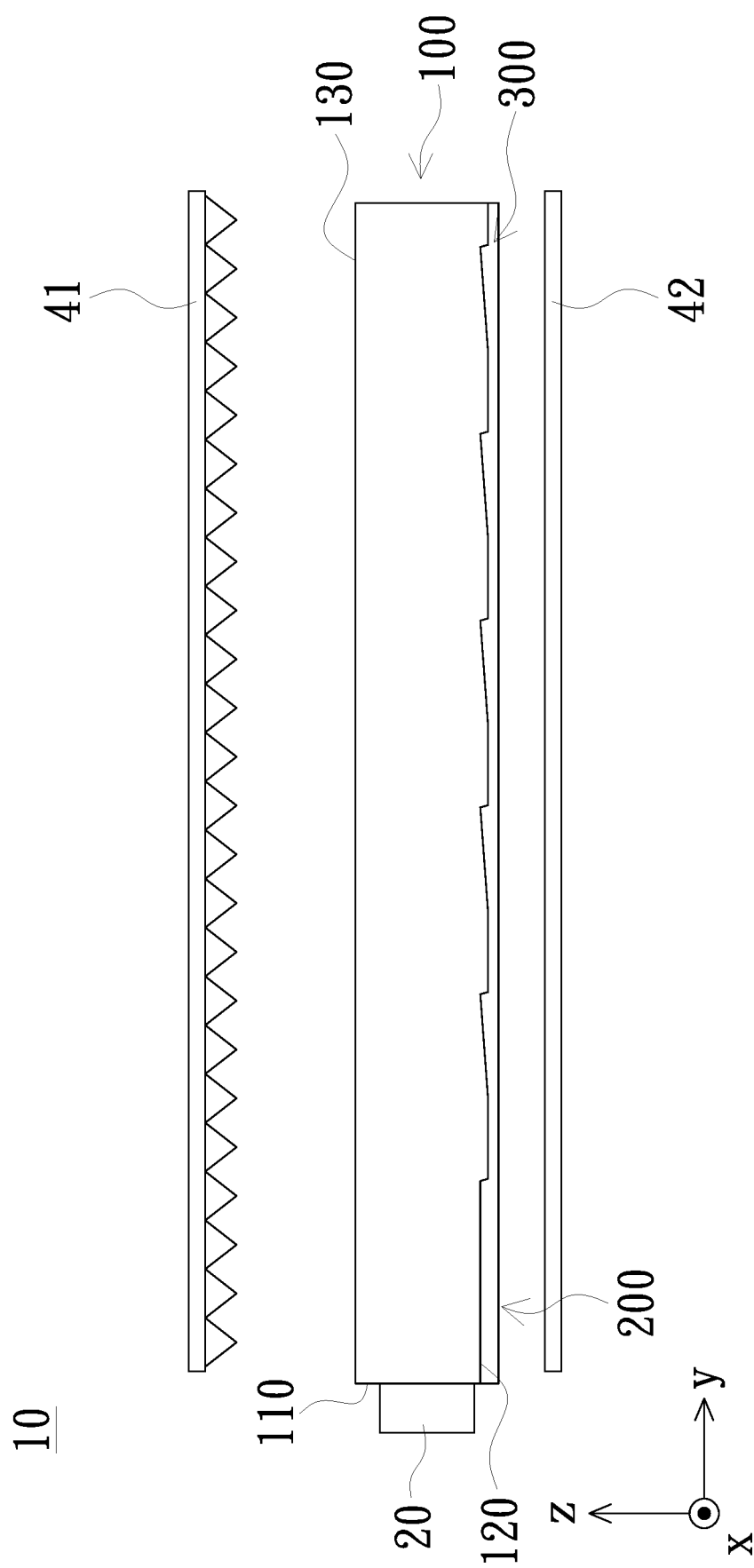
FIG. 10 is a schematic side view of a backlight module of an embodiment of the invention.

The invention further provides a backlight module. In the embodiment as shown in FIG. 10, the backlight module 10 includes the above-mentioned light guide plate 100 and a light source 20; however, it is understood that the light guide plate 100 may be replaced by any one of the light guide plates 100a-100e as requested. The light source 20 is disposed beside the light-incident surface 110 of the light guide plate 100 and may be but not limited to a light-emitting diode. In the embodiment, the backlight module 10 may further include an optical film 41, which is disposed on the light-emitting surface 130 of the light guide plate 100. The optical film 41 may be any film which is able to improve light use efficiency, surface light source uniformity or light-emitting angle adjustment, such as the brightness enhancement film, the diffuser film or a combination thereof. In addition. The backlight module 10 may further include a reflective sheet 42 disposed on the bottom surface 120 of the light guide plate 100.

In one embodiment, the optical film 41 mentioned above may be a brightness enhancement film such as a reverse prism sheet, and the reflective sheet 42 may be, for example, an enhanced specular reflector (ESR), but the invention is not limited thereto. In a specific embodiment, the second microstructure 300 can be designed, with the optical film 41, such that the third angle θ3 thereof is equal to or close to 177 degrees, and the fourth angle θ4 thereof is between 90 and 180 degrees and may be further limited to 135 degrees. The light exited from the light guide plate 100 is further adjusted by the optical film 41 to exit in the forward direction (i.e., substantially in the z-axis). On the other hand, the first microstructure 200 may be designed such that 90 degrees ≤θ1<135 degrees and 90 degrees ≤θ2<135 degrees.

The table below provides effective data based on a design in which θ3=177 degrees and θ4=135 degrees according to an embodiment of the invention. In the embodiment in which θ1=θ2=90 degrees, the luminance gain of the backlight module 10 is set to 1; in the embodiment in which the first microstructure 200 is not provided, the luminance gain of the backlight module 10 is 1.05; in the embodiment in which θ1=θ2=105 degrees, the luminance gain of the backlight module 10 is 1.04; and in the embodiment in which θ1=θ2=135 degrees, the luminance gain of the backlight module 10 is 0.65. The term "FWHM" in the table refers to a viewing angle corresponding to half of the maximum luminance, wherein "x" means the x-axis direction and "y" means the y-axis direction. Compared to the embodiment in which the first microstructure 200 is not provided, in the embodiment in which θ1=θ2=105 degrees, the horizontal viewing angle in the x-axis is decreased from 38.5 to 31.5 degrees, a good effect in decreasing the horizontal viewing angle is obtained and meanwhile the luminance gain is still maintained at 1.04. In the embodiment in which θ1=θ2=90 degrees, the horizontal viewing angle in the x-axis is further decreased to 30.7 degrees, a good effect in decreasing the horizontal viewing angle is obtained and meanwhile the luminance gain is still maintained at 1. In the embodiment in which θ1=θ2=135 degrees, the horizontal viewing angle in the x-axis is increased from 38.5 to 39 degrees, the effect in decreasing the horizontal viewing angle cannot be obtained and meanwhile the luminance gain is decreased to 0.65 apparently.

| θ1、θ2 | Without the first microstructures 200 | θ3 = 177 degrees、θ4 = 135 degrees | | |
|---|---|---|---|---|
| | | 90 degrees | 105 degrees | 135 degrees |
| Luminance gain | 1.05 | 1 | 1.04 | 0.65 |
| FWHM (x/y) | 38.5 degrees/ 20.1 degrees | 30.7 degrees/ 18.2 degrees | 31.5 degrees/ 17.9 degrees | 39 degrees/ 21.4 degrees |

According to the effects and comparisons listed in the above table, it is known that by the design of the light guide plate 100 of the embodiment of the invention particularly in which the first microstructures 200 have a design of 90 degrees ≤θ1<135 degrees and 90 degrees ≤θ2<135 degrees and the second microstructures 300 have a design of 150 degrees ≤θ3<180 degrees and 90 degrees ≤θ4<180 degrees, the desired luminance gain can be maintained meanwhile the effect of the light-emitting angle adjustment and the horizontal viewing angle reduction are also achieved.

Figure 11:
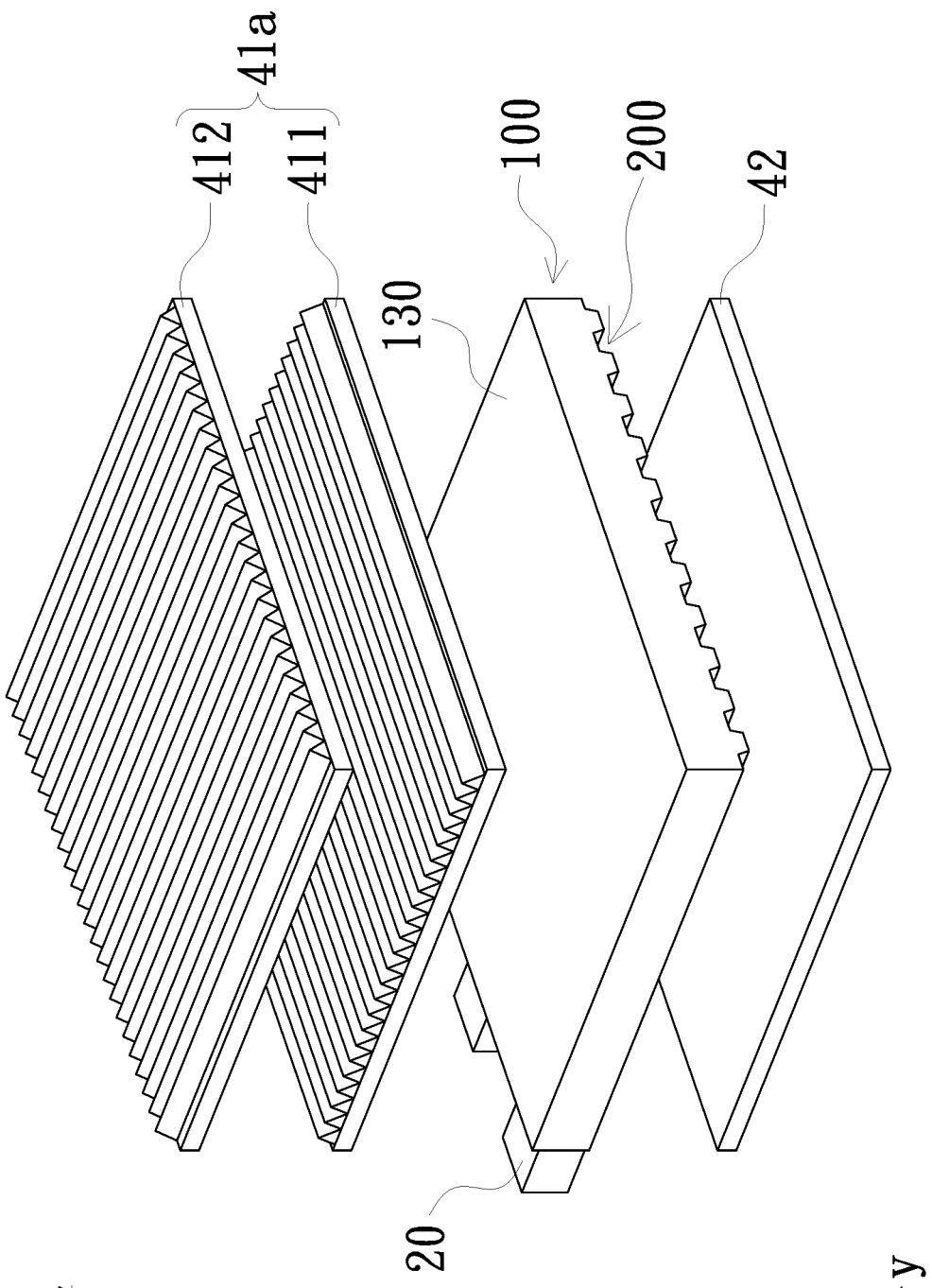
FIG. 11 is a schematic exploded diagram of a backlight module of another embodiment of the invention.

In another embodiment as shown in FIG. 11, the optical film 41a of the backlight module 10a may include a first prism sheet 411 and a second prism sheet 412, wherein the prism structure of the first prism sheet 411 is perpendicular to the prism structure of the second prism sheet 412. In the embodiment, the second microstructures 300 may be correspondingly designed to have the third angle θ3 located between 155 and 161 degrees, and the fourth angle θ4 located between 90 and 180 degrees. In another embodiment, in addition to the first prism sheet 411 and the second prism sheet 412, the optical film 41a may further include a diffuser sheet disposed under the first prism sheet 411 and/or above the second prism sheet 412, but is not limited thereto.

In the embodiment as shown in FIG. 10 and FIG. 11, since the reflective sheet 42 only contacts the first microstructures 200 of the light guide plate 100 and the first microstructures 200 are arranged at intervals, the contact area between the light guide plate 100 and the reflective sheet 42 is relatively small so as to prevent the reflective sheet 42 from being sucked and the scratch caused by the contact friction. In other embodiments, the contact area may be further reduced by adopting the light guide plate 100d. Since the first height H1 of the first microstructures 200 is designed to 1 μm≤H1≤20 μm, a groove along the y-axis formed between the two adjacent first microstructures 200 has a sufficient depth, which allows the dust particles to move in the space formed between the reflective sheet 42 and the light guide plate 100 when the dust particles are present between the reflective sheet 42 and the light guide plate 100, thereby reducing the probability that the dust particles directly contact the reflective sheet 42 or the light guide plate 100 to scratch the reflective sheet 42 or the light guide plate 100.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive.

Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first microstructure, the second microstructure, the first light-guiding surface and the second light-guiding surface are only used for distinguishing various elements and do not limit the number of the elements.

What is claimed is:

1. A light guide plate, comprising a light-incident surface, a bottom surface, a light-emitting surface, a plurality of first microstructures and a plurality of second microstructures, the bottom surface being opposite to the light-emitting surface, and the light-incident surface being connected between the bottom surface and the light-emitting surface, wherein:

the plurality of first microstructures protrude from the bottom surface and are arranged at intervals along a direction parallel to the light-incident surface and extend from the light-incident surface in a predetermined direction away from the light-incident surface; and the plurality of second microstructures is disposed between the plurality of first microstructures, each of the plurality of second microstructures comprises a plurality of light-adjusting blocks protruding from the bottom surface and arranged along the predetermined direction, wherein each of the plurality of the light-adjusting blocks comprises a first inclined surface and a second inclined surface, the first inclined surface faces away from the light-incident surface and tilts relative to the bottom surface, and a third angle $\theta 3$ is formed between the first inclined surface and the bottom surface, the second inclined surface faces the light-incident surface, and a fourth angle $\theta 4$ is formed between the second inclined surface and the bottom surface, wherein the third angle $\theta 3$ is greater than or equal to 150 degrees and less than 180 degrees, the fourth angle $\theta 4$ is greater than or equal to 90 degrees and less than 180 degrees; each of the plurality of first microstructures has a first height relative to the bottom surface, each of the plurality of the light-adjusting blocks has a second height relative to the bottom surface, and the second height is smaller than the first height.

2. The light guide plate according to claim 1, wherein each of the plurality of first microstructures comprises a first light-guiding surface and a second light-guiding surface extending along the predetermined direction, and a first angle $\theta 1$ is formed between the first light-guiding surface and the bottom surface, a second angle $\theta 2$ is formed between the second light-guiding surface and the bottom surface, wherein the first angle $\theta 1$ is greater than or equal to 90 degrees and less than 135 degrees, the second angle $\theta 2$ is greater than or equal to 90 degrees and less than 135 degrees.

3. The light guide plate according to claim 2, wherein each of the plurality of first microstructures further comprises a first connecting surface opposite to the bottom surface, and the first connecting surface has two opposite sides connected to the first light-guiding surface and the second light-guiding surface respectively.

4. The light guide plate according to claim 3, wherein the first connecting surface is a convex curved surface.

5. The light guide plate according to claim 3, wherein the first connecting surface further comprises a planar portion and a curved portion, and the first connecting surface is connected to the first light-guiding surface and the second light-guiding surface by the curved portion.

6. The light guide plate according to claim 1, wherein each of the plurality of the light-adjusting blocks further comprises a second connecting surface opposite to the bottom surface, and the second connecting surface has two opposite sides connected to the first inclined surface and the second inclined surface respectively.

7. The light guide plate according to claim 6, wherein the second connecting surface has a length parallel to the predetermined direction, and the length is shorter when the light-adjusting block is farther away from the light-incident surface.

8. The light guide plate according to claim 6, wherein the second connecting surface has a length parallel to the predetermined direction and the length is less than or equal to 100 μm.

9. The light guide plate according to claim 1, wherein the plurality of first microstructures further comprises a plurality of first light-guiding columns and a plurality of second light-guiding columns, wherein a height of the first light-guiding column is greater than a height of the second light-guiding column, and at least one of the second light-guiding columns is disposed between any two adjacent first light-guiding columns.

10. A backlight module, comprising a light guide plate and a light source, wherein:

the light guide plate has a light-incident surface, a bottom surface, a light-emitting surface, a plurality of first microstructures and a plurality of second microstructures, the bottom surface is opposite to the light-emitting surface, and the light-incident surface is connected between the bottom surface and the light-emitting surface, wherein:

the plurality of first microstructures protrudes from the bottom surface and are arranged at intervals along a direction parallel to the light-incident surface and extends from the light-incident surface in a predetermined direction away from the light-incident surface; and the plurality of second microstructures is disposed between the plurality of first microstructures, each of the plurality of second microstructures comprises a plurality of light-adjusting blocks protruding from the bottom surface and arranged along the predetermined direction, wherein each of the plurality of the light-adjusting blocks comprises a first inclined surface and a second inclined surface, the first inclined surface faces away from the light-incident surface and tilts relative to the bottom surface, and a third angle θ3 is formed between the first inclined surface and the bottom surface, the second inclined surface faces the light-incident surface, and a fourth angle θ4 is formed between the second inclined surface and the bottom surface, wherein the third angle θ3 is greater than or equal to 150 degrees and less than 180 degrees, the fourth angle θ4 is greater than or equal to 90 degrees and less than 180 degrees; each of the plurality of the first microstructures has a first height relative to the bottom surface, each of the plurality of the light-adjusting blocks has a second height relative to the bottom surface, and the second height is smaller than the first height; and the light source is disposed beside the light-incident surface of the light guide plate.

11. The backlight module according to claim 10, further comprising at least one optical film disposed on the light-emitting surface of the light guide plate.

* * * * *